(12) United States Patent
Gebhardt et al.

(10) Patent No.: US 12,663,321 B2
(45) Date of Patent: Jun. 23, 2026

(54) SYSTEM AND METHOD FOR NON-INVASIVE DETERMINING OF A FLUID TEMPERATURE

(71) Applicant: ABB Schweiz AG, Baden (CH)

(72) Inventors: Joerg Gebhardt, Mainz (DE); Paul Szasz, Plankstadt (DE); Guruprasad Sosale, Munich (DE)

(73) Assignee: ABB Schweiz AG, Baden (CH)

( * ) Notice: Subject to any disclaimer, the term of this patent is extended or adjusted under 35 U.S.C. 154(b) by 425 days.

(21) Appl. No.: 18/312,888

(22) Filed: May 5, 2023

(65) Prior Publication Data

US 2023/0358620 A1 Nov. 9, 2023

(30) Foreign Application Priority Data

May 6, 2022 (EP) .................................... 22172012

(51) Int. Cl.
| | |
|---|---|
| *G01K 13/02* | (2021.01) |
| *G01K 1/143* | (2021.01) |
| *G01K 7/42* | (2006.01) |

(52) U.S. Cl.
CPC ............. *G01K 13/02* (2013.01); *G01K 1/143* (2013.01); *G01K 7/427* (2013.01)

(58) Field of Classification Search
CPC ......... G01K 1/143; G01K 13/02; G01K 7/427
(Continued)

(56) References Cited

U.S. PATENT DOCUMENTS

| | | | | |
|---|---|---|---|---|
| 4,825,704 A | * | 5/1989 | Aoshima ................... | G01F 5/00 73/202 |
| 7,058,549 B2 | * | 6/2006 | Gysling ................ | G01F 1/7082 702/45 |

(Continued)

FOREIGN PATENT DOCUMENTS

| | | | | |
|---|---|---|---|---|
| DE | 102020120054 A1 | * | 2/2022 | ............. G01K 1/143 |
| EP | 0720006 A1 | | 7/1996 | |

(Continued)

OTHER PUBLICATIONS

Gebhardt et al., "Non-invasive temperature measurement of turbulent flows of aqueous solutions and gases in pipes," *tm—Technisches Messen*, 87(9): 553-563 (Sep. 2020).

(Continued)

*Primary Examiner* — Mirellys Jagan
(74) *Attorney, Agent, or Firm* — Fitch Even Tabin & Flannery LLP

(57) ABSTRACT

A system for non-invasive determining of a fluid temperature of a fluid in a pipe, comprising a surface temperature sensor disposed at a pipe surface of the pipe; a reference temperature sensor disposed outside of the pipe; a data interface, configured for receiving nominal process parameters; a process parameter sensor, configured for determining at least one measured process parameter, wherein the at least one measured process parameter relates to measured parameters of a process that relates to the fluid in the pipe; and a process model, configured for determining a calculated fluid temperature of the fluid in the pipe by using the determined surface temperature, the determined reference temperature, the received nominal process parameters and the at least one measured process parameter.

12 Claims, 3 Drawing Sheets

Figure 1:
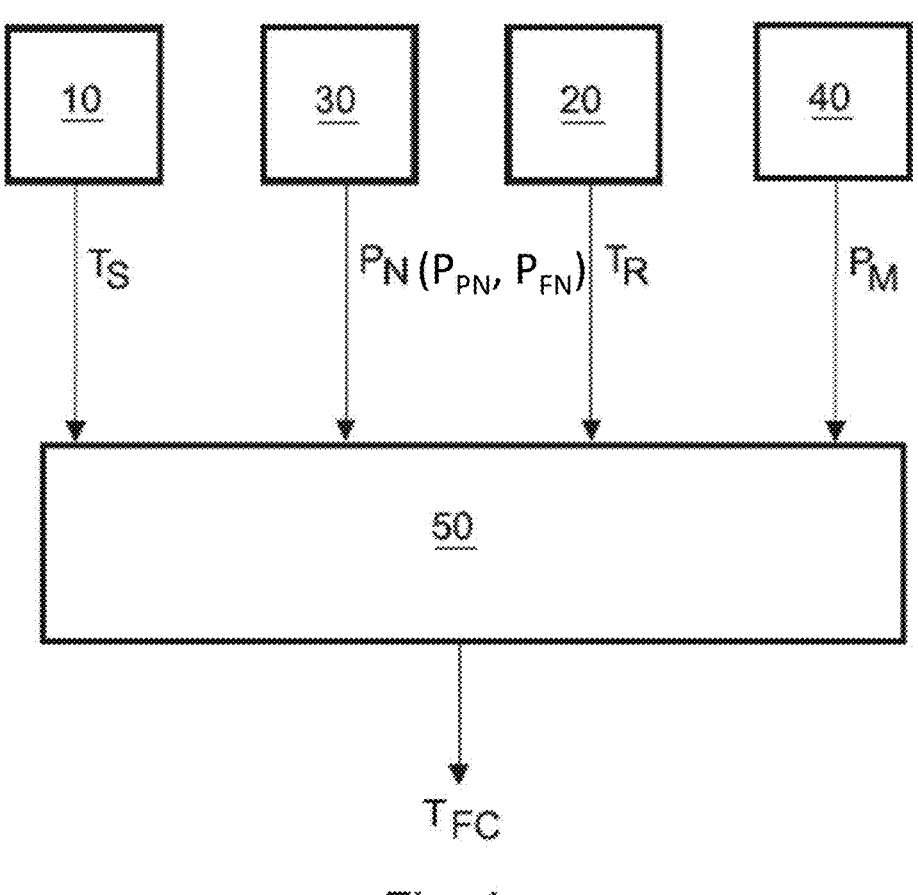

(58) Field of Classification Search
USPC ................................................. 374/148, 208
See application file for complete search history.

(56) References Cited

U.S. PATENT DOCUMENTS

| 2005/0235755 | A1 | 10/2005 | Hindman |
| 2014/0251020 | A1 | 9/2014 | Offer et al. |
| 2017/0212065 | A1* | 7/2017 | Rud ....................... G01K 1/143 |
| 2020/0408580 | A1 | 12/2020 | Gebhardt et al. |
| 2021/0190562 | A1 | 6/2021 | Rud et al. |
| 2023/0358585 | A1* | 11/2023 | Szasz ................... G01F 1/6847 |

FOREIGN PATENT DOCUMENTS

| EP | 3387405 | A1 | 10/2018 |
| EP | 3537124 | B1 | 1/2021 |
| EP | 3771895 | A1 | 2/2021 |
| ES | 2724775 | A1 | 9/2019 |
| GB | 2454220 | A | 5/2009 |
| WO | WO 2016/198430 | A2 | 12/2016 |
| WO | WO 2016/198430 | A3 | 2/2017 |
| WO | WO 2017/060714 | A1 | 4/2017 |
| WO | WO 2017/097877 | A1 | 6/2017 |
| WO | WO 2017/097888 | A1 | 6/2017 |
| WO | WO 2020/068781 | A1 | 4/2020 |

OTHER PUBLICATIONS

European Patent Office, Extended European Search Report in European Patent Application No. 22172012.1, 8 pp. (Oct. 24, 2022).

* cited by examiner

SYSTEM AND METHOD FOR NON-INVASIVE DETERMINING OF A FLUID TEMPERATURE

CROSS-REFERENCE TO RELATED APPLICATIONS

This patent application claims priority to European Patent Application No. 22172012.1, filed on May 6, 2022, which is incorporated herein in its entirety by reference.

FIELD OF THE DISCLOSURE

The invention relates to a system and method for non-invasive determining of a fluid temperature of a fluid in a pipe.

BACKGROUND OF THE INVENTION

Non-invasive temperature sensing is a safer and simpler means of measuring process temperature without the need to penetrate the piping. Aside from requiring temperature measurements to monitor plants or optimize plant performance, an accurate process temperature measurement is also required to compensate temperature dependent errors in other devices in the vicinity. For instance, gas flow meters need an accurate measurement of the gas temperature in order to increase their accuracy by accounting for the density and compressibility changes of the gas. Typically, temperature measurement is achieved with invasive thermowells. Aside from the risk of catastrophic failure, thermowells have an error of measurement that cannot be easily predicted. The complex fluid structure interaction of the gas flow and the heat losses in the stem to the surrounding ambient through the thermowell are not easily modelled or calculable. Unfortunately, this is still state of the art and the most widely used approach. A simpler approach would be to utilize the pipe as the thermal sensor and infer the true process temperature using the surface temperature of the pipe and ambient temperature as a reference. In EP 3 537 124 B1, such a model-based measurement procedure is described. However, the models used to predict the process temperature from surface temperature measurements can be affected by both pressure and flow conditions and may be influenced by several other process parameters. The differences are also further exacerbated by the ambient temperature conditions which affect not only the measured surface temperature but also the heat transferred away from the pipe. This is a major drawback in merely using traditional surface sensors without any compensation for the ambient temperature.

Non-invasive temperature sensing can therefore produce significant deviations due to pressure and/or flow variations, for which there is often no local sensor available (And ambient conditions that affect the accuracy of any physics predictions of the difference between the surface temperature and the process and also affects the accuracy of the surface temperature measurement itself. This is especially the case on gas filled pipes, as the heat conductivity may strongly depend on pressure and/or flow and/or other process parameters, i.e. in particular parameters of the pipe system and the medium (liquid, gas or mixture). Some of the parameters may change over time during process plant operation. This limits the efficiency and market potential of non-invasive temperature sensing, even if it is model based, especially in gas applications.

BRIEF SUMMARY OF THE INVENTION

It is therefore an objective of the invention to provide a system for non-invasive determining of a fluid temperature in a pipe with improved accuracy. According to an aspect of the invention, a system for non-invasive determining of a fluid temperature of a fluid in a pipe, comprises: A surface temperature sensor disposed at a pipe surface of the pipe, configured for determining a surface temperature of the pipe surface. A reference temperature sensor disposed outside of the pipe, configured for determining a reference temperature of the pipe. A data interface, configured for receiving nominal process parameters, wherein the nominal process parameters relate to nominal parameters of a process that relates to the fluid in the pipe. A process parameter sensor, configured for determining at least one measured process parameter, wherein the at least one measured process parameter relates to measured parameters of a process that relates to the fluid in the pipe. A process model, configured for determining a calculated fluid temperature of the fluid in the pipe by using the determined surface temperature, the determined reference temperature, the received nominal process parameters and the at least one measured process parameter.

In other words, the accuracy of the non-invasive temperature measurement on a fluid filled pipe is improved by using a model-based correction of the measured surface temperature, in particular based on various parameters, further preferably including pressure and/or flow in the pipe.

The term "non-invasive temperature measurement", as used herein, relates to a temperature sensor used for determining the temperature of the fluid does not reach into the pipe. In this case, the non-invasive temperature measurement relates to a measurement of the temperature of the fluid in the pipe based on the measurement of the surface temperature sensor and the reference temperature, to which by using a model-based correction, an actual fluid temperature is determined, which is referred to as calculated fluid temperature. This means that no invasive temperature sensor is needed to gain information on the fluid temperature. Non-invasive, as used herein, relates to a form of sensing, wherein no probe penetrates the pipe wall or protrudes into the flow of the fluid in the pipe.

The term "nominal process parameter", as used herein, comprises information about the process that is performed using the fluid and the pipe that are known, for example by predetermination or pre-estimation. In other words, the nominal process parameters are provided to the system by a data interface so that the system, in particular the process model is provided with general information about the pipe, the fluid and the process carried out itself. The nominal process parameters are for example stored in a database and just read out by the system. Alternatively, the nominal process parameters are read out from control system information from nearby sensors. Part of the nominal process parameters (e.g. fluid information) can also be provided as input values during device setup.

BRIEF DESCRIPTION OF THE SEVERAL VIEWS OF THE DRAWING(S)

FIG. 1 schematically shows a process model for determining a calculated fluid temperature in accordance with the disclosure.

Figure 2:
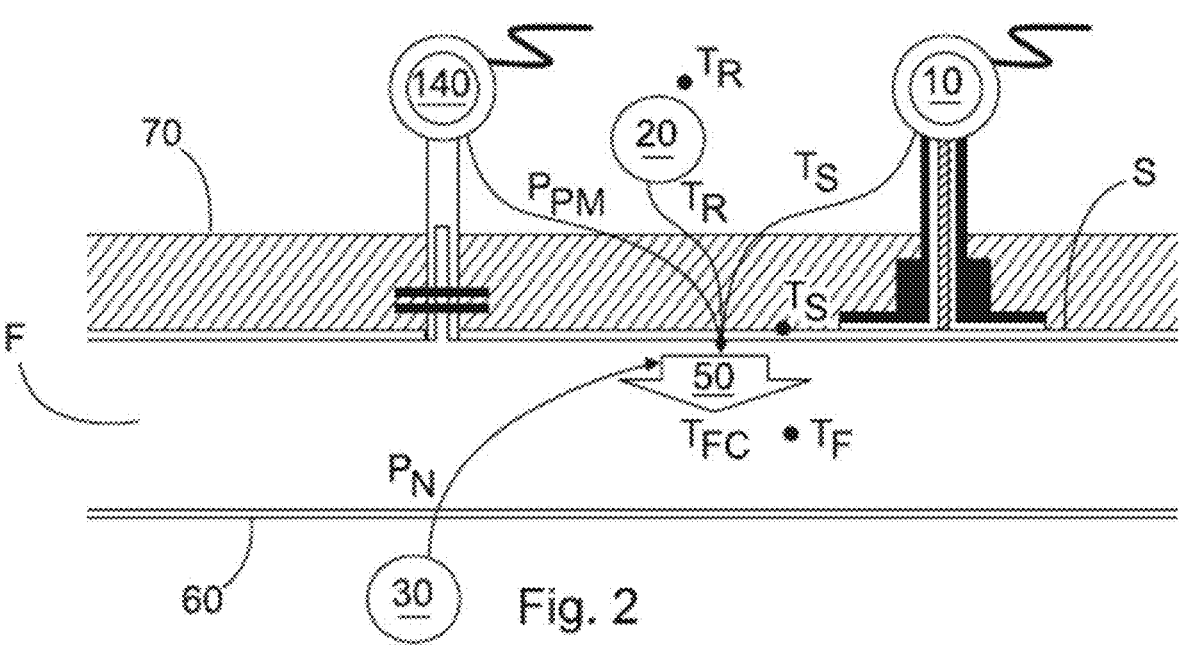

FIG. 2 schematically shows system for non-invasive determining of a fluid temperature of a fluid in a pipe according to a first embodiment in accordance with the disclosure.

Figure 3:
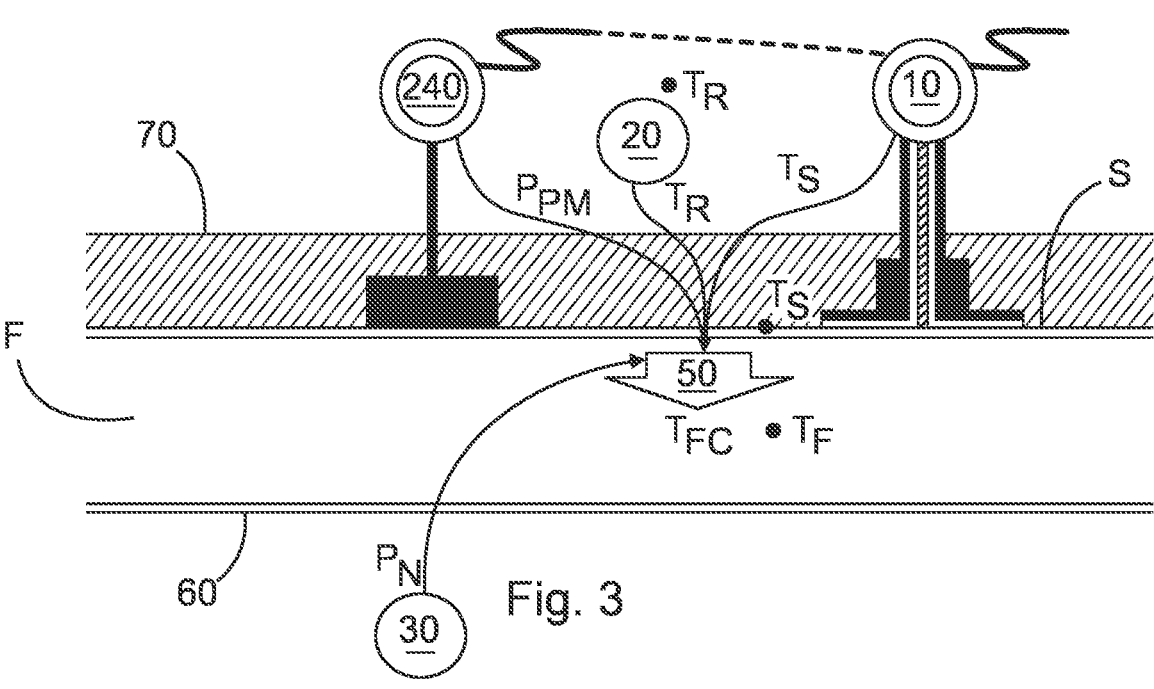

FIG. 3 schematically shows system for non-invasive determining of a fluid temperature of a fluid in a pipe according to a second embodiment in accordance with the disclosure.

Figure 4:
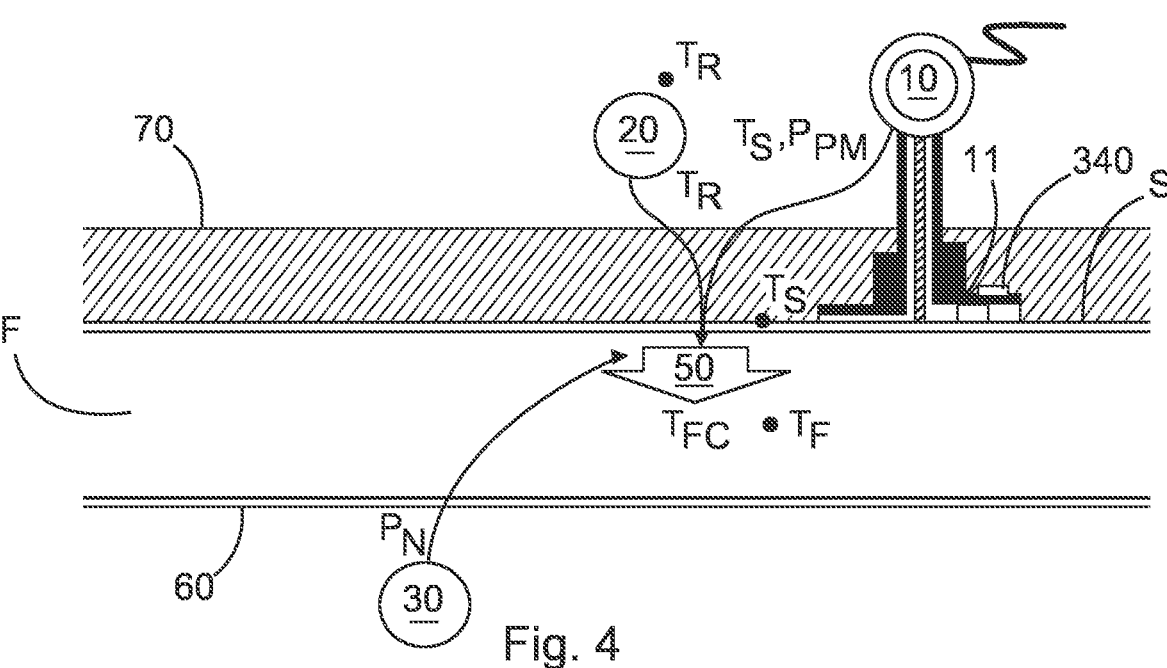

FIG. 4 schematically shows system for non-invasive determining of a fluid temperature of a fluid in a pipe according to a third embodiment in accordance with the disclosure.

Figure 5:
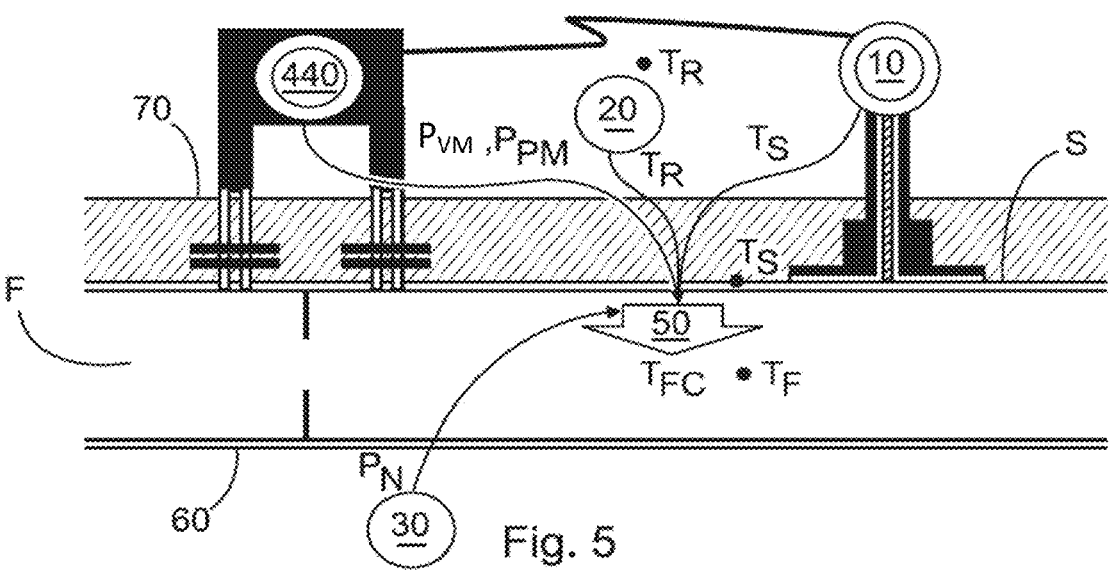

FIG. 5 schematically shows system for non-invasive determining of a fluid temperature of a fluid in a pipe according to a fourth embodiment in accordance with the disclosure.

Figure 6:
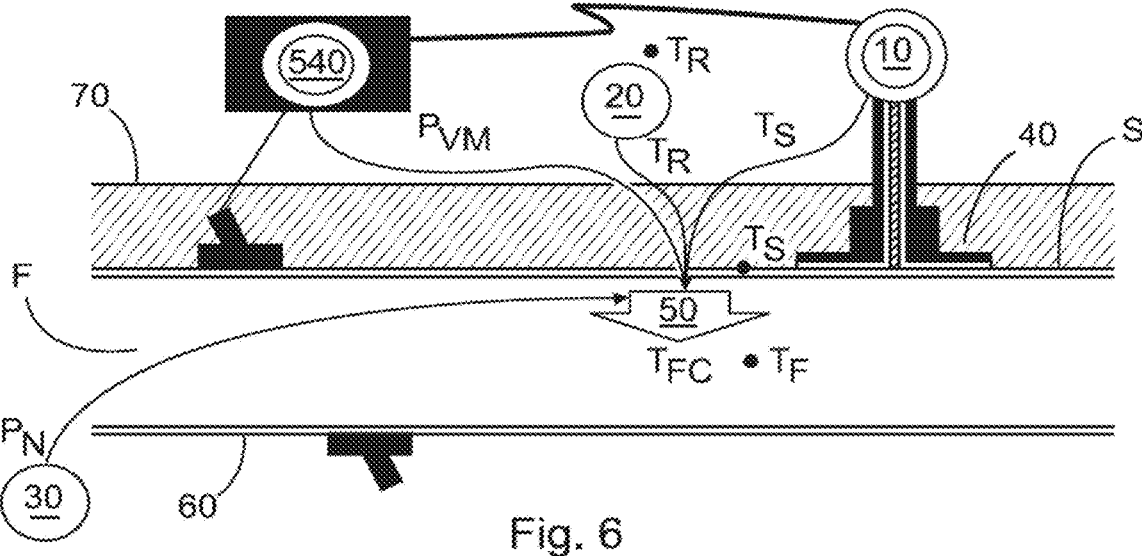

FIG. 6 schematically shows system for non-invasive determining of a fluid temperature of a fluid in a pipe according to a fifth embodiment in accordance with the disclosure.

Figure 7:
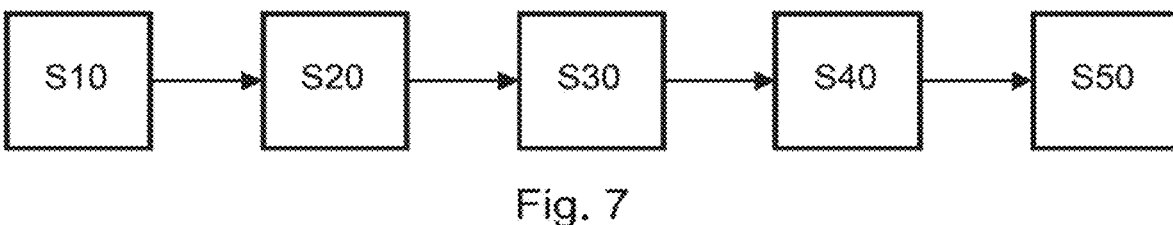

FIG. 7 schematically shows a method for non-invasive determining of a fluid temperature of fluid in a pipe in accordance with the disclosure.

The reference symbols used in the drawings, and their meanings, are listed in summary form in the list of reference symbols. In principle, identical parts are provided with the same reference symbols in the figures.

DETAILED DESCRIPTION OF THE INVENTION

FIG. 1 schematically shows a process model 50. The process model 50 is configured for determining a calculated fluid temperature $T_{FC}$ of a fluid F in a pipe 60 by using a measured surface temperature $T_S$, a measured reference temperature $T_R$, received nominal process parameters $P_N$ and at least one measured process parameter $P_M$. The process model 50 gets the necessary input data from a plurality of entities connected with the process model 50. The input data is either measured, known, predetermined and/or pre-estimated.

A surface temperature sensor 10 provides the process model 50 with a surface temperature $T_S$. The surface temperature $T_S$ reflects the temperature at the pipe surface S of the pipe 60 between the pipe 60 and an insulation 70 of the pipe 60. A reference temperature sensor 20 provides the process model 50 with an reference temperature $T_R$. The reference temperature $T_R$ reflects the temperature outside of the insulation 70 of the pipe 60. A data interface 30 provides the process model 50 with at least one nominal process parameter $P_N$. The at least one nominal process parameter $P_N$ reflects nominal properties of the process related to the fluid F in the pipe 60, or in other words, properties of the process that are known, predetermined and/or pre-estimated. The at least one nominal process parameter $P_N$ comprises least one nominal pipe parameter $P_{PN}$, reflecting properties of the pipe 60 and at least one nominal fluid parameter $P_{FN}$, reflecting properties of the fluid F, wherein the at least one nominal pipe parameter $P_{PN}$ comprises a geometry of the pipe 60 and/or a material of the pipe 60, wherein the at least one nominal fluid parameter $P_{FN}$ comprises a nominal viscosity of the fluid F, a nominal heat conductivity of the fluid F, a nominal fluid pressure of the fluid F and/or a nominal fluid velocity of the fluid F.

FIG. 2 schematically shows a system for non-invasive determining of a fluid temperature TF of a fluid F in a pipe 60 according to a first embodiment. During a production process, a fluid F runs through a pipe 60. For analysis and/or monitoring reasons, a temperature of the fluid in the middle of the pipe 60 needs to be known. This temperature is referred to a fluid temperature TF. For non-invasive temperature measurement, a surface temperature sensor 10 is disposed at a pipe surface S of the pipe 60. The surface temperature sensor 10 however is only able to directly determine a surface temperature $T_S$, being the temperature of the outer surface of the pipe 60. In general, the pipe 60 is surrounded by an insulation 70. Consequently, the surface temperature $T_S$ relates to the temperature between the outer side of the pipe 60 and the insulation 70.

In order to determine the fluid temperature $T_F$, which as describes is not directly measured by the surface temperature sensor 10, the system comprises a process model 50 that is configured to provide a calculation of the fluid temperature $T_F$, referred to as calculated fluid temperature $T_{FC}$. The process model 50 uses different inputs in addition to the measured surface temperature $T_S$ to perform an estimation algorithm that provides the calculated fluid temperature $T_{FC}$.

The system comprises a reference temperature sensor 20 that is arranged outside of the pipe 60, in particular outside of the insulation of the pipe 60. The reference temperature sensor 20 is configured for determining a reference temperature $T_R$ outside of the pipe 60. The determined reference temperature $T_R$ is provided to the process model 50.

The system further comprises a data interface 30 that is configured for receiving nominal process parameters $P_N$, wherein the nominal process parameters $P_N$ relate to nominal parameters of a process that relates to the fluid F in the pipe 60. In other words, the nominal process parameters $P_N$ comprise information about the fluid F and the pipe 60 that is known due to the nature of the process. The nominal process parameters $P_N$ comprise at least one nominal pipe parameter $P_{PN}$ and at least one nominal fluid parameter $P_{FN}$, wherein the at least one nominal pipe parameter $P_{PN}$ comprises a geometry of the pipe 60 and/or a material of the pipe 60, wherein the at least one nominal fluid parameter $P_{FN}$ comprises a nominal fluid viscosity of the fluid F, a nominal fluid heat conductivity of the fluid F, a nominal fluid pressure of the fluid F and/or a nominal fluid velocity of the fluid F. The nominal process parameters $P_N$ are provided to the process model 50.

The system further comprises a process parameter sensor 40, in this embodiment being an invasive process parameter sensor 140, configured for determining at least one measured process parameter $P_M$. Further specifically, in this embodiment, the invasive process parameter sensor 140 is an invasive pressure sensor 140 that is configured for directly measuring a fluid pressure P in the pipe 60. Consequently, the invasive pressure sensor 140 provides a measured fluid pressure PPM. The measured fluid pressure PPM is provided to the process model 50.

The process model 50 is thus provided with the inputs, surface temperature $T_S$, reference temperature $T_R$, nominal process parameters $P_N$ and measured fluid pressure $P_{PM}$. The process model 50 uses the inputs to calculate the calculated fluid temperature $T_{FC}$. Consequently, the process model 50 allows to enhance an accuracy of the known non-invasive temperature measurement that is based on the surface temperature sensor 10.

FIG. 3 schematically shows a system for non-invasive determining of a fluid temperature $T_F$ of a fluid F in a pipe 60 according to a second embodiment. Compared to the first embodiment, as described in FIG. 2, the process parameter sensor 40 in this embodiment being a non-invasive process parameter sensor 240, configured for determining at least one measured process parameter $P_M$. Further specifically, in this embodiment, the non-invasive process parameter sensor 240 is a non-invasive pressure sensor 240 that is configured for indirectly measuring a fluid pressure P in the pipe 60.

Consequently, the non-invasive pressure sensor 240 provides a measured fluid pressure $P_{PM}$. The measured fluid pressure $P_{PM}$ is provided to the process model 50.

The process model 50 is thus provided with the inputs, surface temperature $T_S$, reference temperature $T_R$, nominal process parameters $P_N$ and measured fluid pressure $P_{PM}$. The process model 50 uses the inputs to calculate the calculated fluid temperature $T_{FC}$. Consequently, the process model 50 allows to enhance an accuracy of the known non-invasive temperature measurement that is based on the surface temperature sensor 10.

FIG. 4 schematically shows a system for non-invasive determining of a fluid temperature $T_F$ of a fluid F in a pipe 60 according to a third embodiment. Compared to the second embodiment, as described in FIG. 3, the non-invasive pressure sensor 340 is an integrated non-invasive pressure sensor 340 that is integrated into a clamping system 11 of the surface temperature sensor 10 and that is configured for indirectly measuring a fluid pressure P in the pipe 60 is integrated. The clamping system 11 is used to attach the surface temperature sensor 10 on the surface S of the pipe P. Consequently, the non-invasive pressure sensor 340 provides a measured fluid pressure $P_{PM}$. The measured fluid pressure $P_{PM}$ is provided to the process model 50 via the surface temperature sensor 10.

The process model 50 is thus provided with the inputs, surface temperature $T_S$, reference temperature $T_R$, nominal process parameters $P_N$ and measured fluid pressure $P_{PM}$. The process model 50 uses the inputs to calculate the calculated fluid temperature $T_{FC}$. Consequently, the process model 50 allows to enhance an accuracy of the known non-invasive temperature measurement that is based on the surface temperature sensor 10.

FIG. 5 schematically shows a system for non-invasive determining of a fluid temperature $T_F$ of a fluid F in a pipe 60 according to a fourth embodiment. Compared to the first embodiment, as described in FIG. 1, the invasive pressure sensor 440 is a differential pressure flow sensor 440, DP flow sensor. The DP flow sensor 440 is configured for directly measuring a fluid pressure P in the pipe 60 as well as a flow, in other word a fluid velocity in the pipe 60. Consequently, the DP flow sensor 440 provides a measured fluid pressure $P_{PM}$ as well as a measured fluid velocity $P_{VM}$ to the process model 50.

The process model 50 is thus provided with the inputs, surface temperature $T_S$, reference temperature $T_R$, nominal process parameters $P_N$, measured fluid velocity $P_{VM}$ and measured fluid pressure $P_{PM}$. The process model 50 uses the inputs to calculate the calculated fluid temperature $T_{FC}$. Consequently, the process model 50 allows to enhance an accuracy of the known non-invasive temperature measurement that is based on the surface temperature sensor 10.

FIG. 6 schematically shows a system for non-invasive determining of a fluid temperature of a fluid in a pipe according to a fifth embodiment. Compared to embodiment 2 described in FIG. 3, the non-invasive process parameter sensor 540 is a non-invasive flow sensor 540. The non-invasive flow sensor 540 is configured for indirectly measuring a fluid velocity of the fluid F in the pipe 60. Consequently, the non-invasive flow sensor 540 provides a measured fluid velocity $P_{VM}$ to the process model 50.

The process model 50 is thus provided with the inputs, surface temperature $T_S$, reference temperature $T_R$, nominal process parameters $P_N$ and measured fluid velocity $P_{VM}$. The process model 50 uses the inputs to calculate the calculated fluid temperature $T_{FC}$. Consequently, the process model 50 allows to enhance an accuracy of the known non-invasive temperature measurement that is based on the surface temperature sensor 10.

FIG. 7 schematically shows a method for non-invasive determining of a fluid temperature of fluid in a pipe.

In a first step S10, a surface temperature sensor 10 measures a surface temperature $T_S$ of the pipe 60, wherein the surface temperature sensor 10 is disposed at a pipe surface S of the pipe 60. In a second step S20, a reference temperature sensor 20 determines a reference temperature $T_R$ of the pipe 60, wherein the reference temperature sensor 20 is disposed outside of the pipe 60. In a third step S30, a data interface receives nominal process parameters $P_N$, wherein the nominal process parameters $P_N$ relate to nominal parameters of a process that relates to the fluid F in the pipe 60. In a fourth step S40, a process parameter sensor 40 determines at least one measured process parameter $P_M$, wherein the at least one measured process parameter $P_M$ relates to measured parameters of a process that relates to the fluid F in the pipe 60. In a fifth step S50, a process model 50 determines a calculated fluid temperature $T_{FC}$ of the fluid F in the pipe 60 by using the measured surface temperature $T_S$, the measured reference temperature $T_A$, the received nominal process parameters $P_N$ and the at least one measured process parameter $P_M$.

Preferably, the fluid temperature refers to the well-known mean, or bulk, temperature of the fluid, as defined, e.g. in Bergman et al.; "Fundamentals of Heat and Mass Transfer", $7^{th}$ ed. 2011, Sect. 8.2.1. In case of an invasive temperature sensor, the invasive temperature sensor extends a probe into the pipe to the center of the pipe to measure the central fluid temperature, which is also only an approximation of the mean temperature. The estimated fluid temperature provided by the process model according to the invention relates to an estimation of the mean, or bulk, fluid temperature in the pipe.

The term "calculated fluid temperature", as used herein, relates to an estimation of the fluid temperature that is calculated by the process model. In other words, instead of directly measuring the fluid temperature with an invasive sensor, the process model provides a calculated fluid temperature that is more accurate than a measuring said fluid temperature with a non-invasive sensor.

The sensors, namely the surface temperature sensor, the reference temperature sensor and the process parameter sensor are connected to a common electronic unit within which the processing of the signals and the process model, carrying out the determination of the calculated fluid temperature, also referred to as correction algorithm, are implemented.

Preferably, the fluid is gas.

Preferably, the fluid is a compressive fluid.

Preferably, the pipe parameter, which is also referred to as pipe parameter set, comprises a pipe diameter, a wall thickness of the pipe, a nominal distance of an invasive temperature measurement from a pipe wall of the pipe, process data of the pipe wall, material data of the pipe wall and/or insulation of the pipe. The process data of the pipe wall preferably comprises material properties of the pipe, like thermal conductivity and/or heat capacity. The process data of the pipe wall are potentially influenced by the process. In other words, the material properties of the pipe may be dependent on temperature or other process parameters.

In general, a set of nominal values for process parameters is often sufficient for a good measurement with liquids but may not deliver sufficiently accurate results for gases. For gases, pressure and flow differences lead to deviations in some of the parameters relevant for the thermal model, including e.g., Nußelt number, static thermal conductivity, viscosity etc., and therefore in the calculated fluid temperature. These deviations are in many cases very large. Therefore, additional information on the pressure or flow would be essential.

Thus, the accuracy of the non-invasive temperature measurement on a fluid filled pipe is improved by using a model-based correction of the measured surface temperature, in particular based on various parameters, further preferably including pressure and/or flow (or in other words the fluid velocity) in the pipe.

In a preferred embodiment, the process model is configured for determining a Nußelt number of the fluid by using the at least one measured process parameter, wherein the Nußelt number depends on a Prandtl number of the fluid and a Reynolds number of the fluid, wherein the Prandtl number and the Reynolds number each depend on the at least one measured process parameter, and for determining the calculated fluid temperature by using the determined Nußelt number of the fluid.

As is well known from literature, the thermal resistance between fluid and pipe wall can be formally described as the resistance of a hypothetical thermal boundary layer. A boundary layer is defined as the fluid region in the vicinity of a bounding surface, where the flow and/or the thermal field are to a large extent influenced by the interaction with the boundary (cf., e.g., Bergman et al.; "Fundamentals of Heat and Mass Transfer", 7th ed. 2011). Usually, the real thickness of boundary layers occurring is not actually used. Instead, the pipe diameter D is considered as scale of the layer, and the Definitions of Nußelt and of Reynold number are adapted to this scale fixation.

A thermal resistance of a fluid boundary layer, the layer between the fluid and the pipe wall, is particularly relevant for the difference of the pipe surface temperature and the fluid temperature. The boundary layer in a pipe flow is generally not rigorously defined regarding its geometric extension. Nevertheless, its thermal resistance (or inverse thermal conductivity) is usually defined as the thermal resistance connecting (or separating) the inner wall temperature and the average (bulk-) temperature of the medium flowing in the pipe.

The thermal resistance depends on the fluid density, and therefore on pressure, and also on fluid velocity in the pipe.

The thermal resistance of the fluid boundary layer in pipe hydrodynamics can be described by the Nußelt number, Nu. It is defined as the ratio of convective to pure conductive heat conductivity across the fluid boundary layer.

Nu in many cases first depends on material data of the fluid, in particular on the Prandtl number, Pr, in particular in accordance with equation 1.

$$Pr = v/\alpha = v\rho c_p/\lambda = \eta c_p/\lambda \qquad \text{Equation 1}$$

wherein $v$ is the kinematic viscosity of the fluid, a is the thermal diffusivity of the fluid, $\eta$ is the dynamic viscosity of the fluid, $\lambda$ is the thermal conductivity of the fluid cp is the specific heat capacity of the fluid and $\rho$ is the density of the fluid.

The Prandtl number is the ratio of momentum to thermal diffusion constants. It is generally a function of temperature and pressure, but for pressure between 0.1 and 10 bars in gases it is determined just by the adiabatic (isentropic)

exponent of the gas. For the fluids of interest, Pr can be determined as exactly as necessary in the form: Pr=Pr(T, P)

The second ingredient for Nu is the Reynolds number, Re, in the situation of interest. Re is determined by material data of the fluid and process parameters as outlined in equation 2:

$$Re = \rho v d/\eta = v d/v \qquad \text{Equation 2}$$

wherein $v$ is the fluid velocity, also referred to as flow or flow velocity, d is the characteristic linear dimension of the pipe, in particular the pipe diameter.

As Re depends on the fluid density $\rho$, it therefore depends on pressure P in case of gases. $\eta$ also may be pressure dependent. In a similar manner, for a given pressure, the density of the fluid remains relatively constant but flow changes have an effect.

In total Nu is defined as outlined in equation 3:

$$Nu = Nu(Re, Pr) = Nu(Re(\dots, P, v), Pr(\dots, P)) \qquad \text{Equation 3}$$

Therefore, knowledge of fluid pressure P and/or fluid velocity v will help to increase the calculation accuracy for Re, for Pr, and for Nu.

As described in detail in EP 3537124 B1: For the process temperature $T_m$ the abovementioned considerations lead to a formula where Tm is a function of at least the following variables:

$$T_m = f\big[T_{surface}, T_{reference}, R_{bl}(P, v, v, \lambda, \rho, \eta, c_P, d),$$
$$R_w(d, d_w^i, \lambda_w^i), R_F(d_{insulation}^i, \lambda_{insulation}^i, h)\big] \qquad \text{Equation 4}$$

Here, $R_{bl}$ is the inverse conductivity (with units: $m^2$ K/W) of the medium boundary layer adjacent to the inner pipe wall surface. $R_w$ is the inverse conductivity of the pipe wall, including possible coatings inside and outside, with thicknesses $d_w^i$, and thermal conductivities $\lambda_w^i$ of the materials. $R_F$ is the inverse conductivity of the insulation layers, if any, and of outside convective boundary layers. Whereas in EP 3537124 B1 the setup and model is used to determine $T_m$, a setup is disclosed where $T_m$ is measured invasively, in order to determine one of the other variables in Equation 4.

According to the disclosure, if all but one of the independent variables on the right side of Equation 4 are known or can be estimated (this would be the parameters $P_N$), the one remaining unknown variable (Pc) can be calculated by inverting the expression in Equation 4. This is possible, at least locally in the space of independent variables, under very general regularity conditions according to the implicit function theorem, well known from classical analysis (e.g. A. N. Kolmogorov, S. V. Fomin, "Elements of the theory of functions and functional analysis," Vols. 1-2, Martino Fine Books (2012).

The invention also is to be understood to include cases when there are more influence factors than explicitly shown in Equation 4 (e.g., in complex flow situations where entry length L and roughness or friction factors (see EP 3537124 B1) of the pipe or other variables may play a role). The basic procedure and learning, then, remains the same.

In the system, a measured value for P and/or v, or some other estimate of P and/or v can be used for a subsequent calculation of the three dimensionless variables, leading to the determination of the accurate calculation of the fluid temperature. Preferably, an estimate or knowledge of real-time flow, e.g., measured flow, is also essential where pressure may be constant or alternately, knowledge of both pressure and flow, as in Multivariable DP measurements, would be valuable for an accurate calculation of the fluid temperature.

The concept can be extended also to the measurement of the pressure in fluid tanks or vessels equipped with at least one invasive temperature measurement point.

In a preferred embodiment, the process model is configured for determining at least one corrected measured process parameter by using the calculated fluid temperature and determining a corrected calculated fluid temperature by using the determined surface temperature, the determined reference temperature, the received nominal process parameters and the at least one corrected measured process parameter.

Using the calculated fluid temperature, the process model is able to start a loop of correcting the measured values of the process parameter sensor. Due to the relationship between pressure/velocity and fluid temperature, the measured process parameter is used to enhance the accuracy of determining the calculated fluid temperature. The calculated fluid temperature basically is a corrected fluid temperature measured by the non-invasive fluid temperature sensor, in other words the non-invasive surface temperature sensor. Having calculated the calculated fluid temperature, said calculated fluid temperature can be used by applying the same relationship between pressure/velocity and fluid temperature to determine a corrected measured process parameter. Although the process parameter sensor provides a very accurate value for the measured process parameter, the process parameter sensor also leaves room for correction due to the nature of sensor use. In another step, the corrected measured process parameter can thus be used to correct the calculated fluid temperature again, determining a corrected calculated fluid temperature. This loop can be repeated until a satisfactory result is achieved, until a difference between a corrected measured process parameter and the measured process parameter is under a predetermined threshold or until a difference between a corrected calculated fluid temperature and the calculated fluid temperature is under a predetermined threshold.

In a preferred embodiment, the at least one measured process parameter comprises a measured fluid pressure, a measured fluid velocity, a measured fluid viscosity, a measured fluid composition and/or a measured fluid heat conductivity. In other words, the at least one measured process parameter comprises a measured value of any of the nominal process parameters. Thus, the at least one measured process parameter provides more accurate information about the process than the respective nominal process parameter that would be available otherwise.

In a preferred embodiment, the nominal process parameters comprise at least one nominal pipe parameter and at least one nominal fluid parameter, wherein the at least one nominal pipe parameter comprises a geometry of the pipe and/or a material of the pipe, wherein the at least one nominal fluid parameter comprises a nominal fluid viscosity of the fluid, a nominal fluid heat conductivity of the fluid, a nominal fluid pressure of the fluid and/or a nominal fluid velocity of the fluid.

In a preferred embodiment, the process parameter sensor comprises an invasive process parameter sensor. The invasive process parameter sensors are usually more cost effective than non-invasive process parameter sensors. In a preferred embodiment, the process parameter sensor comprises a non-invasive process parameter sensor. If a non-invasive pressure sensor is used, typically it will measure changes of the pressure relative to an initial mounting state, needing an initial zero calibration. Non-invasive process parameter sensors do not require a process shutdown to be supplied to the pipe. In a preferred embodiment, the process parameter sensor comprises an integrated non-invasive process parameter sensor, wherein the non-invasive process parameter sensor is integrated into the surface temperature sensor.

In a preferred embodiment, the surface temperature sensor comprises a clamping system that is configured for attaching the surface temperature sensor on a pipe surface of the pipe, wherein the integrated non-invasive process parameter sensor is integrated into the clamping system.

In a preferred embodiment, the integrated non-invasive process parameter sensor is integrated into the clamping system by a strain gauge on a clamp strip of the clamping system, a tensile force sensor in the clamping system or a compressive force sensor between the clamping system and the pipe surface.

Several options for integrating a non-invasive pressure measurement into a clamp around the pipe is conceivable, all relying on quantifying the pressure effect (force variation) in the clamp.

For example, a circumferential strain gauges is applied to the clamp surface. The resulting strain follows the pipe strain sufficiently well as to allow the calculation of a pressure change if pipe geometry and material properties are known. A transfer function between the clamp strip and the pipe can be quantified based on the elasticity ratio of the two.

Alternatively, the tensile force in the clamp is measured by applying a tensional sensor element, e.g., in the tightening components of the clamp (e.g., bolt with strain gauge, or an integrated force sensor). Alternatively, a compressive force sensor element is applied under the clamp (between clamp and pipe) and the variation of this force is measured.

In the last two cases, the pressure change can be calculated from the force signal and elastic parameters of the pipe and the clamp.

In a preferred embodiment, the process parameter sensor comprises a differential pressure flow sensor, configured for determining the measured fluid pressure and the measured fluid velocity.

Consequently, the process model is provided with both a measured fluid pressure and a measured fluid velocity. Due to the relationship between fluid temperature and pressure as well as velocity, the process model can determine the calculated fluid temperature with an improved accuracy, while only using a single invasive sensor for measurement of the process parameters.

In a preferred embedment, the process model is configured for selectively considering the at least one measured process parameter, wherein the selection is based on a user input relating to a demanded accuracy of the calculation of the process model or relating a an accuracy of the at least one measured process parameter and/or based on a pressure within the pipe.

Preferably, the process model is configured to switch on the request for measured process parameter input in cases of low-pressure levels in the pipe, and to switch off the request for sufficiently large pressure levels where the measured process parameter gets irrelevant for the calculation of the calculated fluid temperature.

Further preferably, as parameters for a decision to consider the measured process parameter, or to request by the process model the measured process parameter via the data interface the system can be provided with a required accuracy for the calculation of the process model or a required accuracy for the measured process parameters.

According to another aspect of the invention, a method for non-invasive measuring of a fluid temperature of fluid in a pipe, comprises the following steps: Determining, by a surface temperature sensor, a surface temperature of the pipe, wherein the surface temperature sensor is disposed at a pipe surface of the pipe. Determining, by an reference temperature sensor, an reference temperature of the pipe, wherein the reference temperature sensor is disposed outside of the pipe. Receiving, by a data interface, nominal process parameters, wherein the nominal process parameters relate to nominal parameters of a process that relates to the fluid in the pipe. Determining, by a process parameter sensor, at least one measured process parameter, wherein the at least one measured process parameter relates to measured parameters of a process that relates to the fluid in the pipe. Determining, by a process model, a calculated fluid temperature of the fluid in the pipe by using the measured surface temperature, the measured reference temperature the received nominal process parameters and the at least one measured process parameter.

According to another aspect of the disclosure, a computer program comprising instructions, which, when the program is executed by a computer, cause the computer to carry out the steps of a method, as described herein.

According to another aspect of the disclosure, a computer-readable medium comprising instructions which, when executed by a computer, cause the computer to carry out the steps of a method, as used herein.

LIST OF REFERENCE SYMBOLS 10 surface temperature sensor
11 clamping system
20 reference temperature sensor
30 data interface
40 process parameter sensor
140 invasive pressure sensor
240 non-invasive pressure sensor
340 integrated non-invasive pressure sensor
440 differential pressure flow sensor
540 non-invasive flow sensor
50 process model
60 pipe
70 insulation
S pipe surface
F fluid
$T_S$ surface temperature
$T_R$ reference temperature
$T_F$ fluid temperature
$T_{FC}$ calculated fluid temperature
$P_N$ nominal process parameter
$P_{FN}$ nominal fluid parameter
$P_{PN}$ nominal pipe parameter
$P_M$ measured process parameter
$P_{PM}$ measured fluid pressure
$P_{VM}$ measured fluid velocity All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for non-invasive determining of a fluid temperature of a fluid in a pipe, comprising:

a surface temperature sensor disposed at a pipe surface of the pipe, the surface temperature sensor arranged and configured for determining a surface temperature of the pipe surface;

a reference temperature sensor disposed outside of the pipe and configured for determining a reference temperature of the pipe;

a data interface configured for receiving nominal process parameters, wherein the nominal process parameters relate to nominal parameters of a process that relates to the fluid in the pipe;

a process parameter sensor configured for determining at least one measured process parameter, wherein the at least one measured process parameter relates to measured parameters of the process that relates to the fluid in the pipe; and a process model configured for determining a calculated fluid temperature of the fluid in the pipe by using the determined surface temperature, the determined reference temperature, the received nominal process parameters, and the at least one measured process parameter, wherein the at least one measured process parameter comprises a measured fluid velocity;

wherein the process model is further configured for:

determining at least one corrected measured process parameter including the measured fluid velocity by using the calculated fluid temperature; and determining a corrected calculated fluid temperature by using the determined surface temperature, the determined reference temperature, the received nominal process parameters, and the at least one corrected measured process parameter.

2. The system of claim 1, wherein the process model is further configured for:

determining a Nußelt number of the fluid by using the at least one measured process parameter, wherein the Nußelt number depends on a Prandtl number of the fluid and a Reynolds number of the fluid, wherein the Prandtl number and the Reynolds number each depends on the at least one measured process parameter; and determining the calculated fluid temperature by using the determined Nußelt number of the fluid.

3. The system of claim 1, wherein the nominal process parameters comprise at least one nominal pipe parameter and at least one fluid parameter, wherein the at least one nominal pipe parameter comprises a geometry of the pipe and/or a material of the pipe, wherein the at least one nominal fluid parameter comprises a nominal viscosity of the fluid, a nominal heat conductivity of the fluid, a nominal pressure of the fluid, and/or a nominal velocity of the fluid.

4. The system of claim 1, wherein the process parameter sensor comprises an invasive process parameter sensor.

5. The system of claim 1, wherein the process parameter sensor comprises a non-invasive process parameter sensor.

6. The system of claim 1, wherein the process model is further configured for selectively considering the at least one measured process parameter, wherein the selection is based on a user input relating to a demanded accuracy of the calculation of the process model or relating to an accuracy of the at least one measured process parameter, and/or based on a pressure within the pipe.

7. The system of claim 1, wherein the at least one measured process parameter comprises at least one of a measured fluid pressure, a measured fluid viscosity, a measured fluid composition, and/or a measured fluid heat conductivity.

8. The system of claim 7, wherein the process parameter sensor comprises a differential pressure flow sensor configured for determining the measured fluid pressure and the measured fluid velocity.

9. The system of claim 1, wherein the process parameter sensor comprises an integrated non-invasive process parameter sensor, wherein the non-invasive process parameter sensor is integrated into the surface temperature sensor.

10. The system of claim 9, wherein the surface temperature sensor comprises a clamping system that is configured for attaching the surface temperature sensor on a pipe surface of the pipe; and wherein the integrated non-invasive process parameter sensor is integrated into the clamping system.

11. The system of claim 10, wherein the integrated non-invasive process parameter sensor is integrated into the clamping system, the integrated non-invasive process parameter sensor including one or more of a strain gauge, a tensile force sensor, or a compressive force sensor.

12. A method for non-invasive determining of a fluid temperature of fluid in a pipe, comprising:

determining a surface temperature of the pipe using a surface temperature sensor, wherein the surface temperature sensor is disposed at a pipe surface of the pipe;

determining, by a reference temperature sensor, a reference temperature of the pipe, wherein the reference temperature sensor is disposed outside of the pipe;

receiving, by a data interface, nominal process parameters, wherein the nominal process parameters relate to nominal parameters of a process that relates to the fluid in the pipe;

determining, by a process parameter sensor, at least one measured process parameter, wherein the at least one measured process parameter relates to measured parameters of a process that relates to the fluid in the pipe;

determining, by a process model, a calculated fluid temperature of the fluid in the pipe by using the measured surface temperature, the determined reference temperature, the determined nominal process parameters, and the at least one measured process parameter, wherein the at least one measured process parameter comprises a measured fluid velocity;

determining, by the process model, at least one corrected measured process parameter including the measured fluid velocity by using the calculated fluid temperature; and determining, by the process model, a corrected calculated fluid temperature by using the determined surface temperature, the determined reference temperature, the received nominal process parameters, and the at least one corrected measured process parameter.

* * * * *